Figure 1:
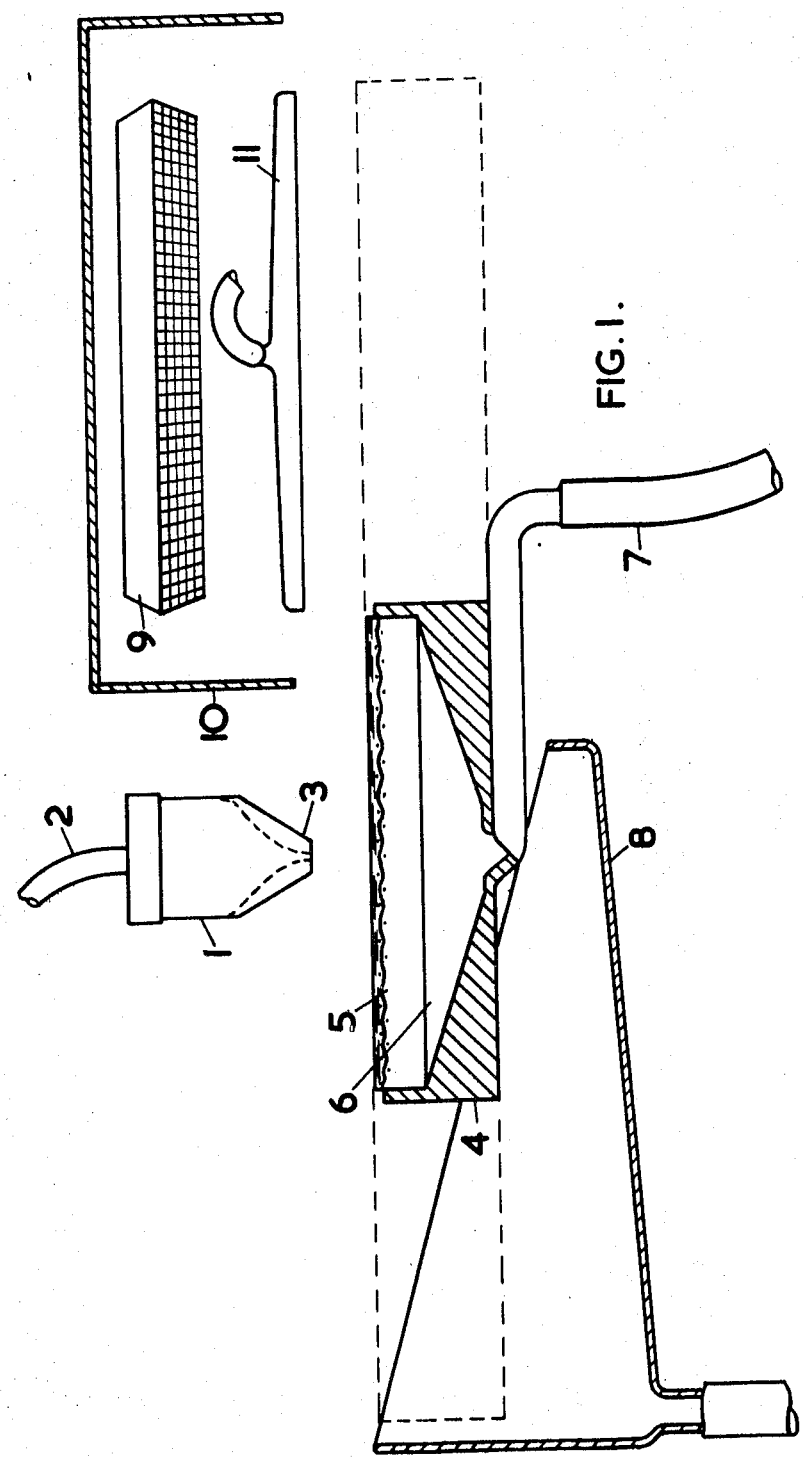
Figure 2:
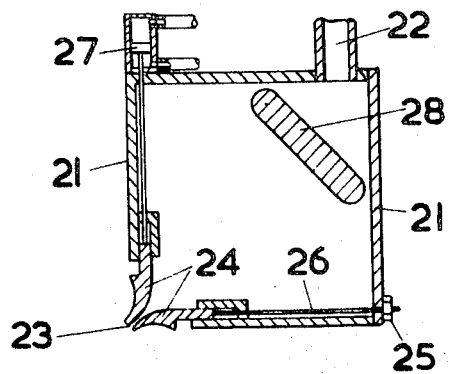

United States Patent

[11] 3,617,437

[72] Inventors Greville Euan Gordon Bagg
Waltham Abbey;
Leslie Ernest Dingle, Waltham Abbey;
Ronald Hayden Jones, London; Alexander
William Harrower Pryde, Waltham Abbey,
all of England
[21] Appl. No. 716,938
[22] Filed Mar. 28, 1968
[45] Patented Nov. 2, 1971
[73] Assignee National Research Development
Corporation
London, England
[32] Priority Mar. 29, 1967
[33] Great Britain
[31] 14,201/67

[54] PROCESS FOR THE MANUFACTURE OF A
COMPOSITE MATERIAL HAVING ALIGNED
REINFORCING FIBERS
12 Claims, 5 Drawing Figs.
[52] U.S. Cl. ................................................. 162/102,
162/152, 162/153, 264/87, 264/91, 264/108
[51] Int. Cl. ....................................................... B29d 3/02,
D21h 5/18, D21h 5/26

[50] Field of Search........................................... 264/87, 91,
108; 162/152, 153, 156, 217, 123, 298, 299, 212,
214, 216, 102

[56] References Cited
UNITED STATES PATENTS
2,906,660 9/1959 Hungerford et al........... 162/156 X
3,442,997 5/1969 Parratt ......................... 264/108

Primary Examiner—Robert F. White
Assistant Examiner—J. H. Silbaugh
Attorney—Cushman, Darby & Cushman ABSTRACT: A process for the manufacture of a composite material comprising a matrix containing aligned reinforcing fibers includes the steps of dispersing the fibers in a viscous liquid, passing the dispersion through an orifice so that the fibers are at least partially aligned, and laying the dispersion containing aligned fibers upon a permeable surface moving relative to the orifice at a velocity at least that at which the fiber dispersion leaves the orifice and withdrawing the viscous liquid through the permeable surface by suction sufficiently rapidly for the alignment of the fibers thereon to be maintained.

PROCESS FOR THE MANUFACTURE OF A COMPOSITE MATERIAL HAVING ALIGNED REINFORCING FIBERS

The present invention relates to processes for the manufacture of composite materials and is particularly concerned with aligning fibers and including whiskers (that is, elongated single crystal fibers having a length to diameter ratio of at least 10 and generally at least 100) from a random mass of the fibers; with processes for forming composite materials containing a high proportion of aligned fibers; and the improved manufacture of structure from such composite materials.

The invention is aimed particularly to the treatment of fibers, including whiskers, of ceramic materials having high tensile strengths of the order of 40 to 60 million pounds per square inch such as carbon, asbestos, silicon nitride and silicon carbide. Numerous processes have been proposed to align and incorporate the materials in matrices of synthetic resins or metals in order to realize the tremendous potential strength of such composites. However, these high-strength materials are particularly difficult to treat mechanically since they are generally brittle and will lose a considerable proportion of their strength even if only slightly damaged. Further problems arise if the fibers are relatively short and of small dimensions as in the case of whiskers where lengths are generally between 10 and $10^{12}$ mm. Tolerable alignment has been achieved by processes based on the extrusion of fibers dispersed in metal or resin matrices but the resulting fiber concentration is normally considerably below the desirable concentration of at least 50 percent by volume (about 70–80 percent by weight) and the resulting composites have only a fraction of their potential strength. Such extrusion process additionally tend to damage the reinforcing fibers resulting in further strength reductions.

The two factors of fiber concentration in a matrix and the degree of alignment of the fibers are interrelated and critical to the production of worthwhile composite materials. To achieve a high fiber concentration the fibers must pack very well in the matrix. Adequate packing can be achieved only by a substantially parallel alignment of the fibers since misalignment of a relatively small proportion of fibers is sufficient to cause a disproportionately large decrease in fiber packing density. The effect is commonly seen in a box of matches when a few matches become misaligned. The present invention aims to produce a high degree of alignment in which composites are produced having 85 to 100 percent and normally at least 90 percent of the fibers aligned to within 10° at most of the intended direction and in which extremely high fiber loadings up to 70 percent by volume are obtainable. Using suitably strong fibers composites materials may be obtained having a Young's Modulus as high as $30-40\times10^6$ pounds per square inch and a flexural ultimate tensile strength up to 2,000 pounds per square inch. Such high composite strengths are due to three main factors; the high fiber loading; the excellent alignment of the fibers; and the consequent absence of significant number of fibers transverse to the alignment direction which could cut and damage the aligned fibers and reduce the composite's strength.

According to the present invention, a process for the manufacture of a composite material comprising a matrix containing aligned reinforcing fibers includes the steps of dispersing the fibers in a viscous liquid, passing the dispersion through an orifice so that the fibers are at least partially aligned, and laying the dispersion containing aligned fibers upon a permeable surface moving relative to the orifice at a velocity at least that at which the fiber dispersion leaves the orifice and withdrawing the viscous liquid through the permeable surface by suction sufficiently rapidly for the alignment of fibers thereon to be maintained.

The permeable surface may be a filter surface provided, for example, by a gauze or cloth belt. The filter surface is preferably a gauze whose mesh size is just smaller than the length of the greater majority of the fibers, so that it presents low impedance to the flow of liquid through it. Normally the said pressure difference will be maintained using a suction pump acting on the side of the permeable surface remote from that on which the fibers are collected.

Although the permeable surface could be the upper part of a rotating drum, it is preferably a horizontal bed on which the dispersion is poured from a nozzle which extends across the width of the bed. A thick sheet may be built up on the bed by repeated applications of aligned fiber dispersion, either from several nozzles or by repeated passes of the bed past one nozzle. Preferably the nozzle is reciprocated repeatedly beneath the bed in such a manner that the permeable surface whereon fibers are be to aligned is not stationary beneath the nozzle at any time.

The flow of fiber dispersion from the nozzle may be stemmed when a reciprocated bed is stationary, or a drip tray may be provided, dispersion caught in which may be recirculated. Conveniently the filter bed is subjected to suction from a high-displacement vacuum pump. Such a pump can be arranged to remove the liquid and to dry fibers without exerting such a force on the fibers that they may be damaged. The viscous liquid drained from the aligned fibers may be recovered for use in the fiber dispersion.

The crux of the fiber alignment stage of the processes in accordance with the present invention resides in the removal of the viscous liquid from the aligned fibers so rapidly that the fibers have no chance to flow subsequently and become misaligned. In this, the present invention demonstrates an overwhelming advantage over superficially similar processes such as that described in U.S. Pat. No. 2,842,799 (Politzer) in which sponges reinforced with hemp fiber are built up from layers extruded from a slit moving relative to the sponge mould. Politzer's layers are deliberately allowed to settle and merge with consequent migration of fibers and, although no doubt the products are acceptable sponges, the fiber alignment achieved is totally inadequate for the preparation of strong composites.

A very high degree of alignment may be obtained provided that the bed is moved at a velocity greater than the terminal velocity of the aligned fiber dispersion. The longitudinal cross section of the nozzle is conveniently a simple slit. The width of a slit nozzle at exit is preferably 0.03 to 0.08 inch. The contours of the slit walls may advantageously be convex in the direction of flow to present the minimum obstruction to the process of fiber alignment.

Better alignment of a greater weight of fibers per unit volume of viscous carrier is obtainable with increase in the viscosity of the carrier. The ease with which the liquid can be drained from the fibers on the bed, and possibly the degree of alignment maintainable thereon, diminishes with increase in the viscosity, however. Preferably the viscous liquid is water dispersible and water in fine droplet or vapor form is sprayed onto the bed, with insufficient force to disturb fiber alignment, after deposition of a sheet of fibers. Suitable viscous liquid carriers include glycerine, glycerol and aqueous solutions thereof. Heat may be applied to the bed during the process, preferably as a current of hot air directed onto the fibers, to assist in the removal of liquid.

Sheets of aligned fiber may be built up readily by the processes hereinbefore described and the subsequent conversion of these sheets to reinforced composite materials forms an important aspect of the invention. After removal of viscous liquid forming the original dispersion and drying of the aligned sheet, the sheet is impregnated with a synthetic resin, normally a thermosetting resin such as a phenol formaldehyde, epoxy, polyester, or a silicone resin. The resin, usually about 20 percent by weight of the fiber to be impregnated, and dispersed in a suitable solvent to achieve uniform wetting, passed on to the aligned fiber sheet. After impregnation the solvent may be removed by a drying stage and if desired the impregnated felt may be stored in its uncured stage as a "prepreg," or may be cured to any desired extent. Preferably, however, the "-prepreg" is cured to a point at which the impregnating resin is solid at temperatures near room temperature and fluid at a higher temperature. The impregnated felt at this degree of cure is passed through at least one pair of pinch rolls heated to a temperature at which the impregnated resin is fluid whereby the fibers of the felt are pressed into a very high packing density of at least 60 percent by volume or 80–90 percent by weight. This extremely high packing density is retained by immediate solidification of the resin either by cooling or by completion of the cure, so that the natural resilience of the fibers in the aligned sheet is prevented from expanding the resulting composite to a lower fiber density. In accordance with an important feature of the invention the process variables such as pinch roll pressure, thickness of impregnated sheet, etc. are chosen so that the high density compressed resin-bonded sheet reemerging therefrom has a thickness of between of about 0.002 and 0.02 inch and preferably 0.005 to 0.01 inch whereby composite materials are produced having a high degree of flexibility without serious damage to the reinforcing aligned fibers.

The flexibility of composites produced in this way allows them to conform to chosen shapes and to be laminated with their alignment strengths in different direction to produce strong structures which are in effect "composite composites." Layers of the flexible composite are normally attached to one another with a thin layer of synthetic resin which is then cured to give large structure of composite composite which retains an extremely high fiber concentration and consequently a high proportion of reinforcing strength, but which may be readily prepared without the necessity of applying high pressure from large and expensive molds. In particular, by cutting the flexible composite into strips a material is obtained which is eminently suitable for the manufacture of large structures such as rocket motor casings by filament winding techniques. Also these flexible composites are particularly suitable for the formation of strong, lightweight honeycomb structures particularly in airframes.

Many modifications and embodiments of the present processes for the manufacture of composite materials will be apparent to those skilled in this art without departing from the spirit of the invention. For example, cold-setting resins may be used in composite formation and many other viscous liquids may be employed to form the initial dispersion of reinforcing fibers and a dispersion of two or more fiber materials may be used.

Typical examples of processes in accordance with the invention and apparatus in which these processes may be carried will now be described with reference to the accompanying drawings.

Example 1

As shown in FIG. 1, the apparatus includes an applicator 1 having a dispersion supply tube 2 and a nozzle 3. The nozzle 3 is preferably shaped in the flow direction as shown and its orifice is a slit 5 inches long and 0.005 inch wide.

A horizontally movable, level carriage 4 is mounted below the applicator 1. A filter bed 5, of 120-mesh gauze measuring 5 inches by 10 inches is carried by the bed 5, and lies about one-fourth to three-eighths inch below the applicator 1. The carriage 4 forms a plenum chamber 6 below the bed 5 which chamber is connected by a flexible tube 7 to a low-pressure difference high-rate gas suction pump (not shown). Means (not shown) are provided to reciprocate the bed 4 beneath the applicator 1, in the direction shown. Beneath the applicator 1 and the bed 4, there is a drip tray 8 for catching dispersion not applied to the bed 4.

Alongside the applicator 1 is mounted a 2 kw. fan heater 9, about 4 inches above the bed 4 and directed onto the bed 4. A cowl 10 serves to retain the hot air in the region of the bed. A water mist spray 11 is mounted within the cowl 10, also directed towards the bed 4.

Fibers of crysotile asbestos, up to about three-eighths inch long, were dispersed in glycerine having a viscosity of about 1 poise, using a low-energy device so that damage to fibers was minimized. The concentration of fibers in glycerine is up to about 3 percent by weight.

The dispersion is pumped into the applicator 1 at about 10 p.s.i. pressure and emerged from the nozzle 3 at a velocity about 1 f.p.s. The bed 4 is reciprocated horizontally beneath the applicator 1 and the heater 9 at a velocity of about 1½ f.p.s. whereby aligned fibers are deposited on the gauze 5, the glycerine passing through the gauze 5 and being sucked through the flexible pipe 7. As the sheet of aligned fibers is built up on the gauze the hot air from the heater and the suction is sufficient to ensure that the liquid rains through the sheet and the gauze 5, the suction pump developing a suction of between about 5 and 25 inches water gauge. Toward the end of the process a spray of fine water mist is applied from the spray 11 to the gauze 5 to wash the glycerine from the sheet.

After about 40 layers of aligned fibers has been applied a handleable felt is formed which can be lifted from the gauze.

The felt readily adsorbed resin, solvent, and curing agents, which could be poured gently onto it without disturbing the alignment of fibers. Composites were then formed by known methods, the thickness of each 40-layer sheet in the composite after compression being typically about 0.01 inch.

Such a composite of asbestos fibers in epoxy resin had, when tested, a modulus of elasticity of $12\times10^6$ p.s.i. and a flexural ultimate tensile strength of 100,000 p.s.i.

Example 2

A continuous process for the production of aligned fiber, felt and sheet composite therefrom will now be described with reference to FIGS. 2–5 of the accompanying drawings in which:

FIG. 2 is a cross-sectional view through a prealigning nozzle having a variable aperture exit slit;

FIG. 3 is a part-sectional perspective view of apparatus for continuously producing an aligned fiber sheet;

FIG. 4 is a perspective view of apparatus for continuously impregnating the aligned fiber sheet with synthetic resin;

FIG. 5 is a perspective view of apparatus for compressing the impregnated felt to form a thin flexible composite and for cutting therefrom strips suitable for the fabrication of structures by filament winding.

Referring now to FIG. 2 of the drawings, the aligning nozzle consists of a housing 21 having an inlet feed 22, an outlet slit 23 defined by edges 24 movable to a desired initial setting by adjustment of nut 25 mounted on threaded shaft 26. To prevent blockage occurring in the outlet slit 23 one edge 24 is arranged to be withdrawn automatically at the end of each stroke of the nozzle and restores the slit aperture to the original setting when the blockage is cleared.

A baffle 28 is provided to decrease turbulence in the apparatus due to the input of fiber dispersion through the inlet feed 22.

Referring now to FIG. 3, a process for continuously producing an aligned fiber sheet is as follows.

A glycerin fiber dispersion (containing 2 percent by weight of fiber) is transferred by air pressure from a feed tank 30 via valve 31 into an aligning nozzle 32 as described with reference to FIG. 2. At the start of the process the dispersion flows into drip tray 33 from where it is returned to the feed. The drive (not shown) to the endless belt 34 is started and the belt which is formed of 70 B.S.S. mesh phosphor bronze wire moved at a speed calculated to carry out the alignment processes on a reasonable length of belt and is related to the length of travel of the alignment nozzle 32 and the drainage time of the viscous liquid through the sheet to be formed. A suitable belt speed is 2 inches per minute for typical asbestos fiber but can be as high as 1 foot per minute for chopped carbon fiber. Reciprocation of the nozzle 32 is effected by an automatic cycle piston 35 which drives a carriage 36 carrying the nozzle 32 along guides 37 at about 1 f.p.s. and cycles every 10 seconds for typical asbestos, but the cycle time can be appreciably shorter with, for example, chopped carbon fibers. At the finish of a stroke before the return stroke the nozzle 32 retracts into a drip tray 38 which travels with the nozzle and the dispersion from drip tray 38 is returned to the feed tank 30 via a pipe (not shown).

The dispersion of glycerine and fibers emerges from the nozzle 32 in a continuous feed in which the fibers are aligned by passage through the nozzle exit slit set at 0.04-inch separation and this aligned dispersion passes continuously on to the belt 34 which is moving relative to the dispersion at a rate exceeding the rate at which the dispersion flows from the nozzle. The relative movement of the belt 34 maintains alignment of the fibers and the glycerine is rapidly removed through the belt by suction exerted in the suction box 39. The resulting aligned fiber is built up into a felt of the required thickness by the repeated reciprocation of the nozzle and is then passed beneath a water spray 49 which washes residual glycerine from the felt. The glycerine is removed from the suction box 39 via pipe 40 and passes to a cyclone separator 41 where it is deaerated by vacuum pump 42 and then via pipe 43 for admixture with more fibers to form further dispersion. The wash water and the glycerin it contains is passed similarly via pipe 44 and cyclone separator 45 to a glycerine recovery unit 46 and the recovered glycerine and is combined with that in pipe 43. The washed aligned fiber felt is then passed beneath a heater 47 and the dried aligned fiber felt 48 emerges as a material sufficiently strong to be handleable.

Figure 4:
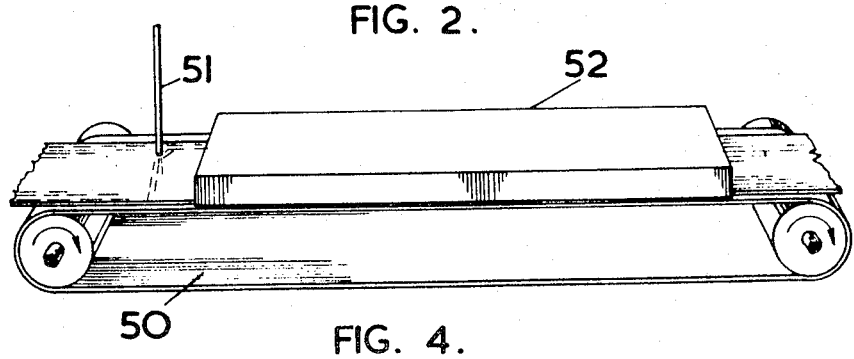

The handleable felt 48 may be taken off onto a roller for storage or may pass for further processing to an impregnation and precure stage. Referring now to FIG. 4, the impregnation section consists of a continuous belt 50 synchronized with belt 34. At the lead end the aligned felt is impregnated spraying from spray jet 51, with a suitable resin such as phenol formaldehyde, epoxy, polyester or a silicone, resin diluted with a soluble solvent to a concentration such that the sheet is uniformly wetted. About 20 percent by weight of resin has been found suitable. The quantity of resin used depends on the composition of the final composite desired and is usually in slight excess. The impregnated felt is now passed into a drying section 12 in which the solvent is evaporated and may be recovered. A degree of precure of the resin can be incorporated at this stage if considered desirable for further processing. When a conventional "prepreg" is required the precure is kept to a minimum and the "prepreg" is taken off onto a drum.

Figure 5:
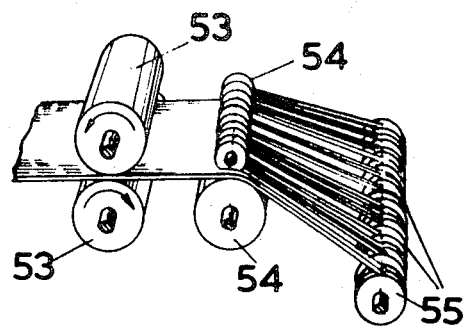
Figure 3:
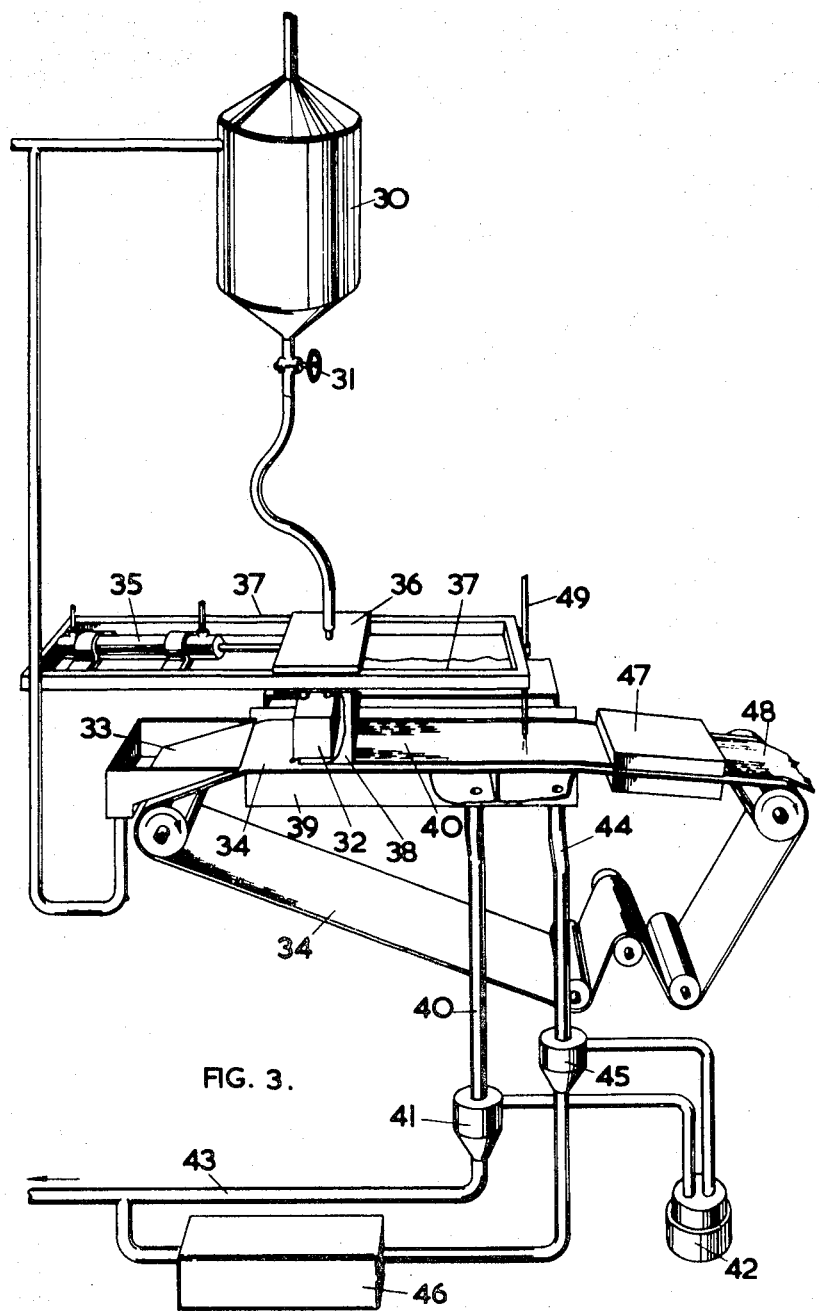

To produce cured strip for the preparation of structures by filament winding processes the "prepreg" is processed on the belt 50 to a precure stage at which the resin is solid at low temperature but fluid at higher temperature. As shown in FIG. 5 the sheet is then passed through at least one pair of heated pinch rolls 53 (or a cycling press) to cure the resin under high pressure to give a composite sheet which is only 5 to 10 thousandths of an inch thick. This composite is passed under cutting rollers 54 to produce flexible strips to any chosen width and which are then wound onto drums 55.

We claim:

1. In a process for the manufacture of a composite material comprising a matrix containing aligned reinforcing fibers, the improvement comprising the steps of
    a. dispersing the fibers in a viscous liquid,
    b. passing the dispersion through an orifice so that the fibers are at least partially aligned,
    laying the dispersion containing aligned fibers upon a permeable surface moving relative to the orifice at a velocity at least that at which the fiber dispersion leaves the orifice and
    d. withdrawing the viscous liquid through the permeable surface by suction sufficiently rapidly for the alignment of the fibers thereon to be maintained.

2. A process according to claim 1 wherein the permeable surface is the circumferential surface of a drum rotating about a substantially horizontal axis.

3. A process according to claim 2 wherein said aligned fibers are continuously formed as a felt upon and removed as a felt from the circumferential surface of the drum.

4. A process according to claim 6 wherein the permeable surface is a horizontal bed.

5. A process according to claim 1 wherein said orifice is in the form of a slit extending above the permeable surface in a direction transverse to the direction of relative movement of the orifice and the aligning surface.

6. A process according to claim 5 wherein said slit width at exit is between about 0.030 and 0.080 inches.

7. A process according to claim 1 wherein said velocity of relative movement between the orifice and the permeable surface is greater then the velocity at which the dispersion flows from the orifice.

8. A process according to claim 1 wherein said orifice is reciprocated longitudinal to the direction of relative movement of the permeable surface and above the permeable surface so that a sufficient thickness of aligned fiber sheet is built up.

9. A process according to claim 8 wherein said permeable surface beneath the reciprocating orifice moves unidirectionally and continuously at a velocity sufficient for each reciprocation of the orifice to deposit a layer of aligned fibers which overlaps and said movement is staggered from the layer deposited by the preceding reciprocation thereby producing a continuous sheet of aligned fiber of a sufficient multilayer thickness.

10. A process according to claim 1 in which the viscous liquid is selected from the group consisting of glycerine, glycerol, aqueous solutions thereof, and aqueous solutions of cellulose ethers.

11. A process according to claim 1 wherein the reinforcing fibers are selected from the group of ceramic materials consisting of carbon, silicon carbide, silicon nitride and asbestos.

12. A process according to claim 1 wherein said aligned fiber on the permeable surface is washed free of viscous liquid while maintaining the fiber alignment and subsequently dried to give a handleable sheet.

* * * * *

UNITED STATES PATENT OFFICE
CERTIFICATE OF CORRECTION

Patent No. 3,617,437　　　　　　　　　Dated November 2, 1971

Inventor(s) BAGG, Greville E.G.; DINGLE, Leslie E.; JONES, Ronald H. and PRYDE, William H.

It is certified that error appears in the above-identified patent and that said Letters Patent are hereby corrected as shown below:

In the heading read "Priority Mar. 29, 1967, Great Britian, 14,201/67" as --Priority Mar. 29, 1967, Great Britian, 14,210/67--.

Signed and sealed this 25th day of July 1972.

(SEAL)
Attest:

EDWARD M. FLETCHER, JR.　　　　　ROBERT GOTTSCHALK
Attesting Officer　　　　　　　　Commissioner of Patents